United States Patent
Doerr et al.

(10) Patent No.: US 11,934,546 B1
(45) Date of Patent: Mar. 19, 2024

(54) SECURE COPY-PASTE METHOD AND SYSTEM

(71) Applicant: OpenFin Inc., New York, NY (US)

(72) Inventors: Chuck Doerr, New York, NY (US); Gavin Lauchlan, Ayr (GB)

(73) Assignee: OpenFin Inc., New York, NY (US)

( * ) Notice: Subject to any disclaimer, the term of this patent is extended or adjusted under 35 U.S.C. 154(b) by 0 days.

(21) Appl. No.: 18/503,930

(22) Filed: Nov. 7, 2023

(51) Int. Cl.
  *G06F 21/62*  (2013.01)

(52) U.S. Cl.
  CPC ...... *G06F 21/6209* (2013.01); *G06F 21/6281* (2013.01); *G06F 21/629* (2013.01); *G06F 21/62* (2013.01); *G06F 21/6245* (2013.01)

(58) Field of Classification Search
  CPC .. G06F 21/62; G06F 21/6209; G06F 21/6245; G06F 21/6281; G06F 21/629
  See application file for complete search history.

(56) References Cited

U.S. PATENT DOCUMENTS

| | | | | |
|---|---|---|---|---|
| 9,672,366 B1 * | 6/2017 | Khetawat | ................ | G06F 9/543 |
| 11,295,029 B1 * | 4/2022 | Greenblatt | ......... | H04N 1/32144 |
| 11,822,680 B1 * | 11/2023 | Speers | ................ | G06F 21/62 |
| 2015/0161406 A1 * | 6/2015 | Fox | ................ | G06F 21/6245 726/27 |
| 2017/0154188 A1 * | 6/2017 | Meier | ................ | G06F 21/552 |
| 2018/0335998 A1 * | 11/2018 | Callaghan | ........... | H04L 67/1095 |
| 2019/0220539 A1 * | 7/2019 | Taylor | ................ | G06F 9/543 |

FOREIGN PATENT DOCUMENTS

| | | | | | |
|---|---|---|---|---|---|
| JP | | 5576563 B2 * | 8/2014 | ............ | G06F 17/24 |
| WO | WO-2007008806 A2 * | | 1/2007 | ......... | G06F 21/6209 |

* cited by examiner

*Primary Examiner* — Jayesh M Jhaveri
(74) *Attorney, Agent, or Firm* — Womble Bond Dickinson (US) LLP (57) ABSTRACT

Disclosed is a method and apparatus for securely copying and pasting data between computer applications. The method includes generating alternative data from copied data from a first computer application. The method further includes adding the alternative data to a copy-paste clipboard and detecting an attempt by a user device to paste the copied data into a user interface. In response to the user interface being associated with a computer application from a predefined list of computer applications, the method further includes pasting, by a processing device, the copied data into the user interface. In response to the user interface being not associated with the computer application from the predefined list of computer applications, the method further includes pasting, by the processing device, the alternative data from the copy-paste clipboard into the user interface.

14 Claims, 6 Drawing Sheets

SECURE COPY-PASTE METHOD AND SYSTEM

TECHNICAL FIELD

This disclosure generally relates to data security. In particular, this disclosure relates to ensuring data security in copy-paste actions between computer applications.

BACKGROUND

Copying and pasting data between computer applications is a major part of daily life for employees of various enterprises, students, and for users of computers worldwide. The copy-paste feature involves a user device selecting data (i.e., picture data, text, etc.) in a user interface of a computing device, copying the data to a copy-paste "clipboard" of the user device, and then pasting the data into a different computer application or another location in the computer application from which the data was copied. Using the copy-paste feature of most computers improves productivity and ensures accuracy of data transfer and entry, especially when transferring data between computer applications.

Data security is one of the top priorities in many enterprises and commercial settings. Unfortunately, copying data between computer applications can lead to data loss or data security breaches when data that should not be copied between one computer application and another is copied and pasted by accident or on purpose (e.g., maliciously). For example, if sensitive data (e.g., account numbers, social security numbers, and other identifying information) is copied from one computer application into an email client, and the sensitive information is shared with an adversarial or malicious system, this can have financial, legal, or personal consequences for the enterprise, the customer whom the data belongs to, or the employee that pasted the sensitive data.

BRIEF DESCRIPTION OF THE DRAWINGS

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

Figure 1:
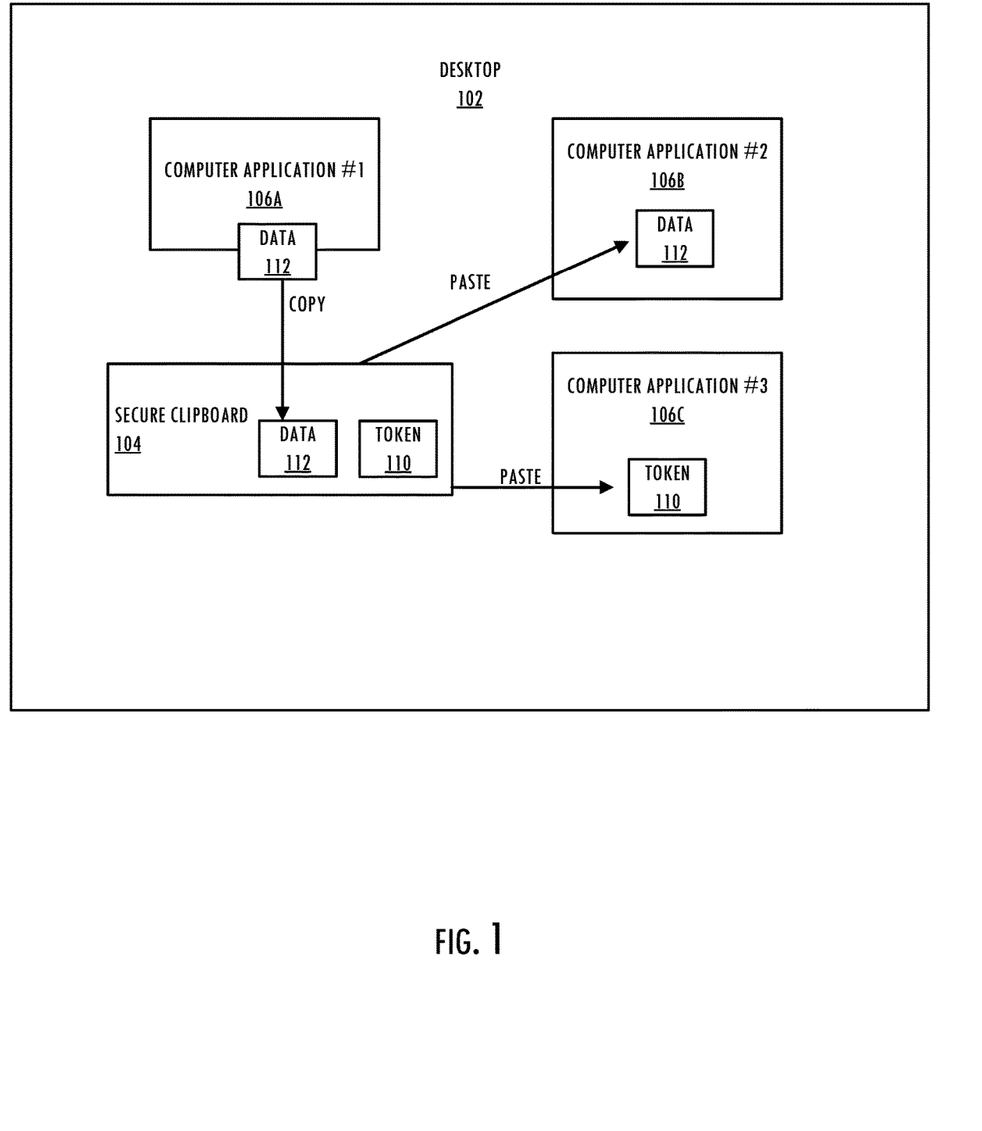
FIG. 1 is a block diagram of an example computing system in accordance with one or more embodiments of this disclosure.

As described above, currently a user may be able to copy and paste data between applications with little security in place to ensure that data breaches do not occur. FIG. 1 illustrates a block diagram of an example computing system 100 in accordance with one embodiment of the present disclosure. The computing system illustrates a desktop 102 and various procedures that take place in the secure copy-paste method disclosed herein. For example, the desktop includes a secure clipboard 104 that represents the virtual clipboard that many modern computing systems include for the purposes of users copying and pasting data around the user interface. For example, in a typical computing system, such as a desktop computer with a monitor (e.g., video screen), mouse, keyboard, and other physical input-output (I/O) devices, a user interface or user device, such as the mouse, may select data or content on the monitor and take some action (e.g., right click an select "Copy") to "copy" the data selected. With the "copy" action, the data is "copied" to the clipboard (i.e., stored into a temporary memory location as described below), and then the user interface completes another action (e.g., right click again and select "Paste") and the data saved to the clipboard is then pasted on the screen where the user interface indicated to do so.

The desktop 102 in FIG. 1 includes various computer applications, including computer application #1 106A, computer application #2 106B, and computer application #3 106C. Those having ordinary skill in the art will appreciate that the typical copy-paste procedure can be performed between computer applications such that data copied from computer application #1 can be copied and then pasted into computer applications #2 and #3. However, in some instances, this free copying and pasting between applications can have substantial security implications and may not be desirable.

The secure copy-paste method described herein improves upon the traditional copy-paste steps by including several security measures to prevent unauthorized copying of data between computer applications. Namely, the secure copy-paste method described herein includes a secure clipboard 104 whose functionality prevents direct pasting of copied data from one computer application to another without the second computer application being approved. For example, as shown in FIG. 1, a user interface is used to copy data 112 (e.g., text, pictures, documents, files, etc.) from computer application #1 106A. According to one embodiment of the secure copy-paste method described herein, the original data copied from computer application #1 is not copied to the secure clipboard as is the traditional operation of most computers. Instead, the originally copied data is stored in memory, and a token 110 is added to the secure clipboard. The token includes data that identifies the original data that was copied. For example, the token can include a memory location of where the actual copied data is stored. As another example, the token can include an encoded text, that, when decoded, provides the actual data that was originally copied. In yet another example, the token can include content that identifies the token as secure token as well as instructions for an end user in case the end user expects pasting to work and they require permission to be able to pasted into a target application.

When the user device attempts to paste the copied data 112 into another computer application, further measures discussed in more detail below are taken to ensure the copied data is only pasted into an approved computer application. For example, the user device may attempt to paste the copied data into computer application #2 106B or computer application #3 106C. Before copying the data into computer application #2 and #3, the method includes performing a check to make sure the applications are part of a list of approved applications to paste to. If the computer application is on the approved list, the originally copied data is pasted. However, if the computer application is not on the approved list, the token is pasted into the non-approved application. For example, computer application #2 is on the approved list, and therefore the originally copied data 112 is pasted into computer application #2, whereas computer application #3 is not on the approved list, and therefore the token 110 is pasted into computer application #3.

In some embodiments, additional data, including the token is pasted to the user interface of computer application #3 and other computer applications that are not on the approved list. For example, the method can include pasting a textual message indicating that the pasted data is a secure paste message, along with the token. For example, text pasted into computer application #3 can include a phrase such as "Secure Copy Paste #TOKEN", where the token 110 is the data identifying the actual copied data in memory. In this way, the user device that is attempting to copy data from one application to another is unable to copy and paste the actual data to the non-approved computer application #3, preventing possible data loss or data breach. Only the token or the phrase and token are pasted, thereby preventing the actual data from being shared accidentally or maliciously.

Figure 2:
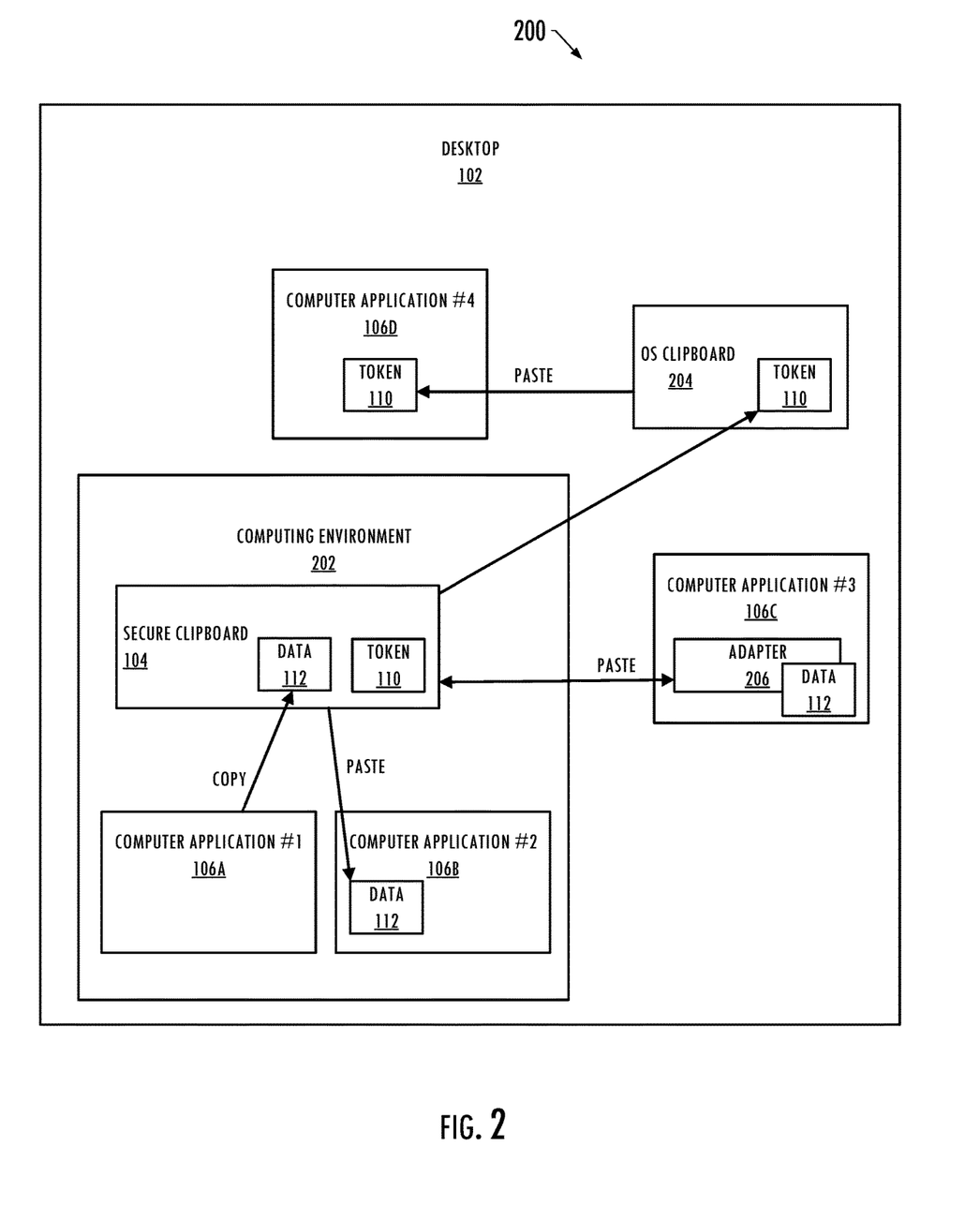
FIG. 2 is a block diagram of a second example computing system in accordance with one or more embodiments of the disclosure.

FIG. 2 illustrates a second computing system 200 including a similar desktop 102 as described above with respect to FIG. 1. However, in this embodiment, a computing environment 202 is included. The computing environment can include a digital or virtual computer workspace where users can view, arrange, and interact with computer applications operating within the computing environment. The computing environment can include application clients, such as virtual machine clients and the like. Alternatively, the computing environment can include web content applications which integrate with other native applications on the desktop 102. The computing environment can have multiple computer applications operating therein, such as for example, computer application #1 106A and computer application #2 106B. Outside the computing environment, but still operating within the desktop 102, additional computer applications can be operating. For example, computer application #3 106C and computer application #4 106D can be operating within the desktop in parallel with the computer applications operating within the computing environment.

In this embodiment, the secure clipboard 104 is associated with the computing environment 202 because the goal is to allow computer applications within the computing environment to freely copy and paste between them. However, computer applications operating within the computing environment and computer applications outside the computing environment are not to copy and paste therebetween without an adapter 206 discussed below.

The functionality in this embodiment is similar to the functionality of the embodiment discussed with respect to FIG. 1 except here, there is a secure clipboard 104 and an operating system (OS) clipboard 204. The secure clipboard 104 handles copying and pasting operations when copying from the computer applications within the computing environment and pasting to other computer applications. For example, computer applications #1 106A and #2 106B are both on a predetermined list of approved computer applications. The secure clipboard 104 will allow the originally copied data 112 to be pasted between computer applications #1 and #2. However, the secure clipboard 104 will also send the token 110 to the OS clipboard 204. As such, when pasting from computer applications operating within the computing environment 202 to the computer applications operating outside of the computer environment the OS clipboard is updated to include the token as well for pasting into unapproved computer applications operating outside of the computer environment. For example, when the user device attempts to paste the originally copied data into computer application #4 106D, which is not on the list of predetermined approved computer applications, the token is pasted into computer application #4.

Computer application #3 106C operates outside the computing environment 202, and is on the approved list of computer applications. However, because it operates outside the computing environment 202, it uses an adapter 206 that operates with the computing environment to translate the token 110 to the originally copied data 112. Effectively, the adapter communicates with the secure clipboard 104 operating within the computing environment to translate the token 110 from the OS clipboard into the originally copied data 112.

Figure 3:
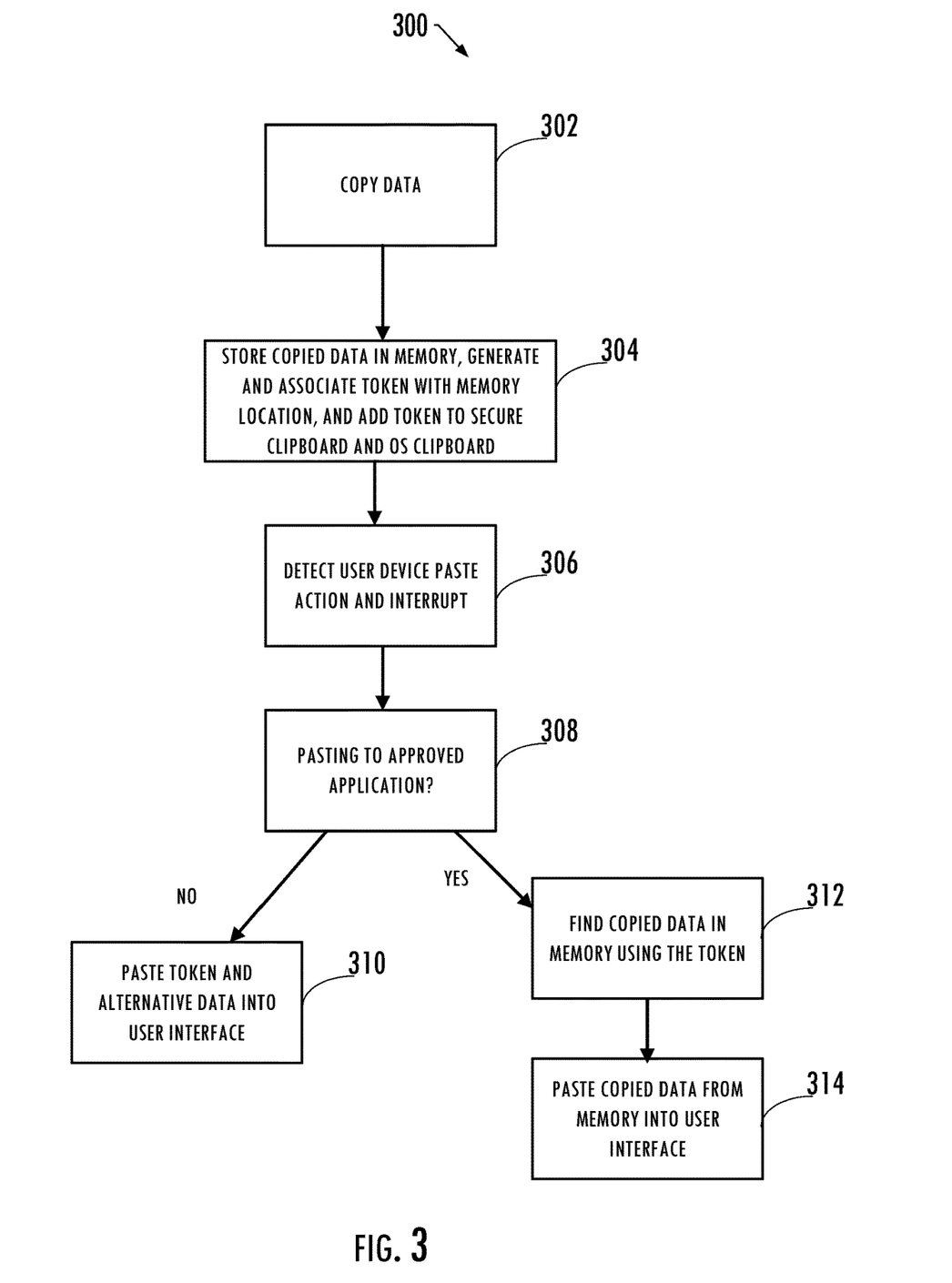
FIG. 3 is a flow chart illustrating various operations of a secure copy-paste method in accordance with one or more embodiments of the disclosure.

FIG. 3 illustrates a more detailed flow chart 300 of the operations that occur in the secure copy-paste method of the present disclosure. In some embodiments, the below functionality is only triggered in a scenario with the computing environment described above with respect to FIG. 2. In some embodiments, the secure-copy paste operations are only triggered when certain applications are copied from. In other embodiments, the secure copy-paste operations are always triggered regardless if there is a computing environment. For example, the secure copy-paste operations discussed herein may always be performed in the embodiment described in FIG. 1.

Referring back to FIG. 3, a user device (e.g., a mouse, keyboard, user interface, etc.) is used to copy data 302 from a first computer application. Once the data has been selected and copied, the originally copied data is stored in memory 304. Those having ordinary skill in the art will understand that the OS clipboard is a buffer that some operating systems provide for short-term storage and transfer within and between application programs. The clipboard is usually temporary and unnamed, and its contents reside in the computer's random access memory (RAM). The clipboard can temporarily store images, text, files, file locations, etc. in memory. In embodiments of the present disclosure, the actual data copied is not stored in the typical clipboard RAM location, but instead in another portion of memory. In some embodiments, the secure clipboard can be the traditional OS clipboard or it can be a separate space in memory. That is, there can be a separate space in memory that acts as the secure clipboard or the traditional OS clipboard can be modified to act as a secure clipboard having the functionality discussed herein.

For example, the secure clipboard 104 of FIG. 1 could be the traditional OS clipboard or a separate space in memory. In some embodiments, there is both a secure clipboard and the normal OS clipboard. For example, the secure clipboard 104 of FIG. 2 would most likely be a separate space in memory since there is also an OS clipboard in that embodiment. These clipboards are just specific locations in memory dedicated to copy-paste functions. As such, when referring to data being "copied to the clipboard", the following description is actually describing what is placed in the appropriate memory locations associated with the OS and secure clipboards.

The token described above is generated and stored in the secure clipboard memory location, in memory 304, and the OS clipboard memory location, if there is one, and the token is mapped to the memory location of where the copied data was stored. For example, if the copied text was stored at memory location 0xDEADBEEF, the token stored in the clipboard will include data that is mapped such that it points to the 0xDEADBEEF memory location, or so that the token can otherwise be associated with the memory location 0xDEADBEEF of the copied data. In some embodiments, the token stored in the clipboard can be a pointer that points to the memory location 0xDEADBEEF. Alternatively, the token can include a universally unique identifier (UUID) that is associated with the copied data, and the UUID is part of the information added to the secure clipboard as part of the token. The UUID is the portion of the token that the secure clipboard uses to look up the copied data and provide it securely as described herein.

Once a user device performs a paste action, the paste action is detected 306 and an interrupt is triggered and executed by the processing device of the computing device on which the computer applications are operating. The computing device includes a predetermined list of approved computer applications to which a secure paste can be performed. For example, a system administrator of the computing device can create a list of computer applications that are approved for pasting to securely. Once the list of approved computer applications is generated, the approved list is inspected 308 by the processor executing the copy-paste action to determine if the computer application being pasted to is on the approved list.

If the computer application that the user device is attempting to paste to is not on the approved list of computer applications, the token 310 is pasted to the user interface of the computer application. For example, if the computer application has a text box and the user device attempts to paste to the text box, the token will be pasted to the text box and not the copied data. In some embodiments, in addition to the token, additional data is pasted into the text box. For example, the phrase "Secure Copy Paste" can precede the token. The token by itself or the token in addition to the preceding phrase may be referred to as "alternative data". In this embodiment, it doesn't matter if the computer application is within the computing environment or within the other part of the desktop in FIG. 2, and it doesn't matter if the data is being pasted from the secure clipboard or the OS clipboard, the textbox of the computer application that is not on the approved list will receive the token and not the originally copied data.

If, on the other hand, the computer application that the user device is attempting to paste to is on the predetermined list of approved applications, the copied data in memory is located 312 using the token. For example, the token is a pointer to the memory location of the copied data, and the pointer is followed to the memory location. The originally copied data is then extracted from memory and pasted to the user interface of the computer application 314.

After the token or the copied data is pasted, the interrupt completes and the process starts at the beginning whereby the computing system operating the computer applications waits for a copy action to be taken by the user device.

Figure 4:
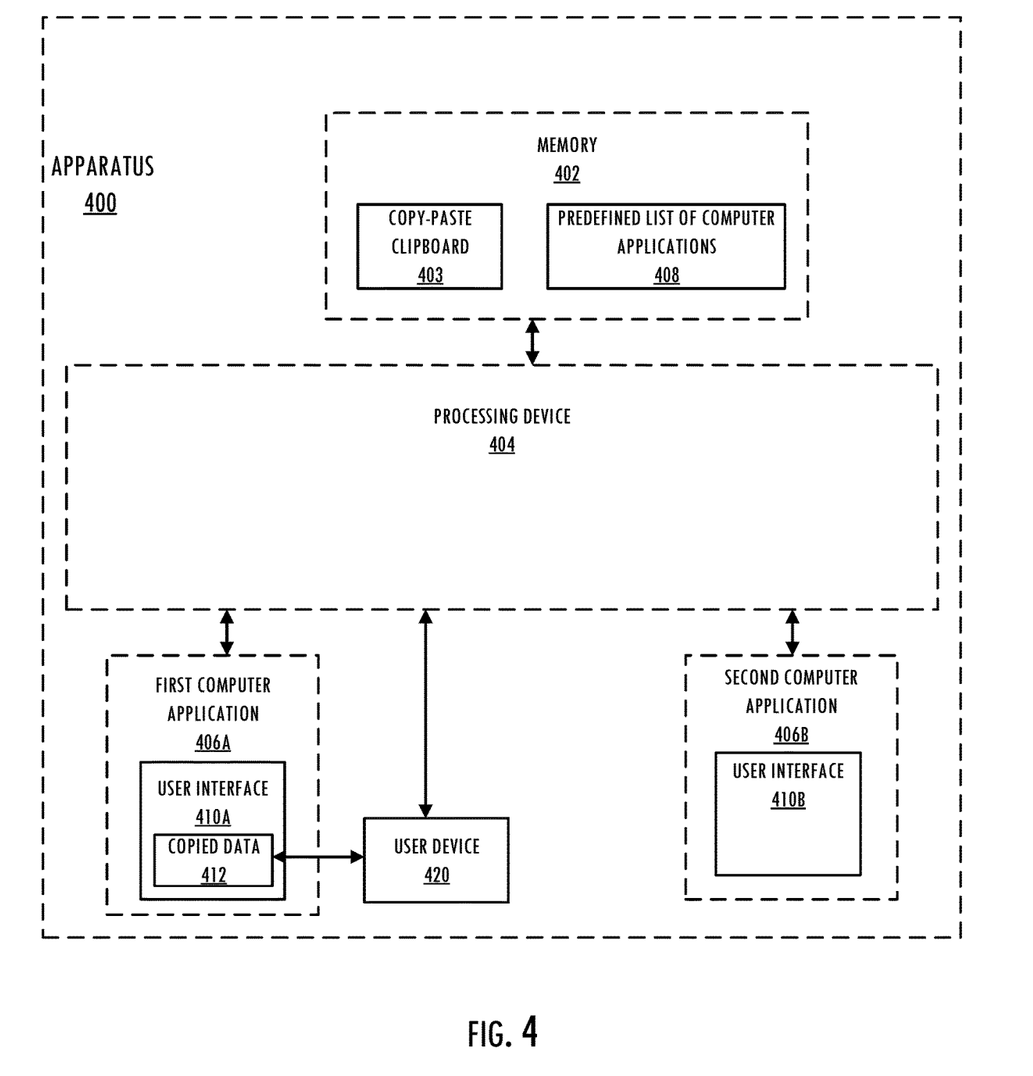
FIG. 4 is a block diagram of an apparatus in accordance with one or more embodiments of the disclosure.

FIG. 4 illustrates a block diagram of an apparatus 400 for performing secure copy-paste operations. In some embodiments, the apparatus comprises a memory 402 to store a copy-paste clipboard 403. As described above, the copy-paste clipboard can include either the secure clipboard from FIG. 1 or FIG. 2 or it can be the OS clipboard of FIG. 2. In some embodiments, the memory stores two copy-paste clipboards, including the secure clipboard and the OS clipboard. In some embodiments, the apparatus further comprises a processing device 404 operatively coupled with the memory. To initiate the secure copy-paste operations, data 412 is first copied from a user interface 410A from a first computer application using a user device 420 (e.g., a mouse, keyboard, indication on a touch screen, etc.). The processing device takes the copied data and stores the copied data, in its original form, in the memory, but in a different location than the location of the copy-paste clipboard.

The processing device is further to generate alternative data from the copied data 412. As described above, the alternative data can include a token associated with the copied data and the processing device is further to add the alternative data, including the token, to the copy-paste clipboard 403 instead of the copied data. The alternative data can further include the preceding phrase such as "Secure Copy Paste" or other alternative data. As described above, in some embodiments, the processing device is further to associate (e.g., map) the token with a memory location where the copied data is stored in the memory. As described above the token can include a pointer to memory or other data such that the token is associated with the memory location of the copied data.

In some embodiments, the processing device 404 is further to add the alternative data, including the token, to the copy-paste clipboard 403. The processing device 404 is further to detect an attempt by a user device 420 to paste the copied data 412 into a user interface 410B of a second computer application 406B. As discussed above, upon detection of this attempt, the processing device is to execute an interrupt to determine whether the user interface is associated with a computer application from or on a predefined list of computer applications 408 that includes computer applications approved for copying to. The predefined list of computer applications can be generated in any suitable way, including a list generated by a system administrator that lists the approved computer applications to which data can be copied. In response to the user interface 410B being associated with a computer application (e.g., second computer application 406B) from the predefined list of computer applications 408, the processing device is to paste the copied data into the user interface. In this embodiment, when it is determined that the user interface is associated with a computer application on the predefined list of computer applications (that is approved for secure copy-paste), the processing device is further to inspect the token and determine a memory location where the copied data is stored in memory based on the token. As discussed above, in some embodiments, the token is a pointer to the memory location where the copied data is stored. In such embodiments, the processing device stores the copied data in memory as part of a key-value store. The copied text is the value in the key-value store, and the token is the key. When the token is presented during a paste operation initiated by a user device, the processing device is to determine the memory location at which the copied data was stored as part of the key-value store, and then return the copied data as the value. The processing device is further to paste the copied data from the memory location to the user interface.

In response to the user interface 410B being not associated with the computer application from the predefined list of computer applications 408, the processing device 404 is to paste the alternative data from the copy-paste clipboard 403 into the user interface 410B. Here again, as described above, the processing device is to execute an interrupt to determine whether the user interface is associated with the computer application on the predefined list of computer applications. If the processing device does determine that the user interface is not associated with the computer application on the predefined list, the processing device is to paste the alternative data in the user interface, the alternative data including at least the token and other data (e.g., the "Secure Copy Paste" message) that does not include the copied data.

In some embodiments, the first computer application 406A is a web application. In some embodiments, the second computer application 406B is a web application. In other embodiments the first computer application or the second computer application are computer applications operating within a workspace as defined herein. In some embodiments either the first or second computer application are computer applications selected from the group consisting of: an email client, word processing application, desktop application, database application, multimedia application, web service, console application, and embedded systems.

Figure 5:
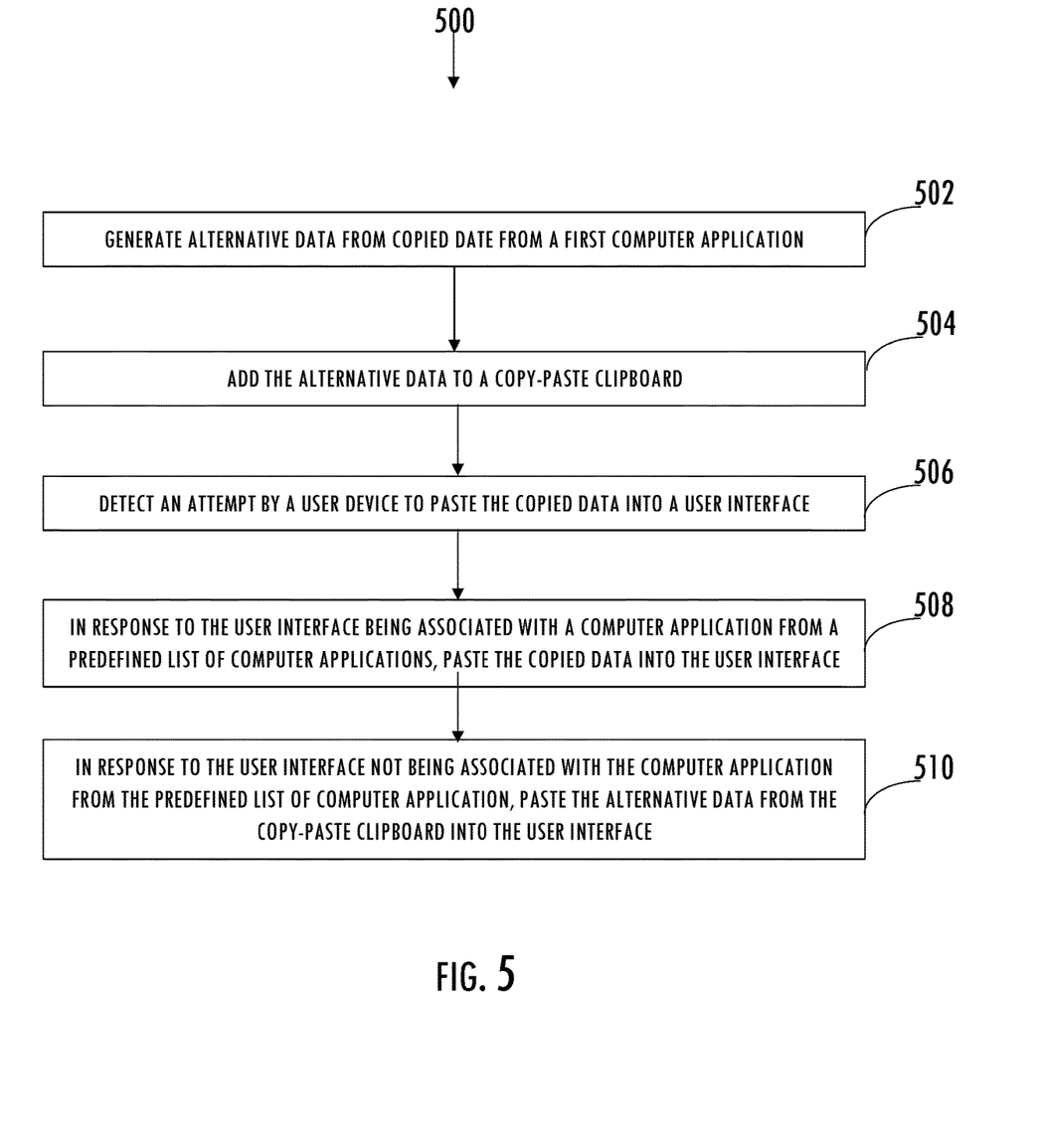
FIG. 5 is a flow diagram of a method in accordance with one or more embodiments of the disclosure.

FIG. 5 is a flow diagram of an example method 500 for securely copying and pasting content or data between computer applications. As shown in block 502, the method includes generating alternative data from copied data from a first computer application. As shown in block 504, the method includes adding the alternative data to a copy-paste clipboard. As shown in block 506, the method includes detecting an attempt by a user device to paste the copied data into a user interface. As shown at block 508, the method further includes, in response to the user interface being associated with a computer application from a predefined list of computer applications, pasting the copied data into the user interface. As shown in block 510, the method further includes, in response to the user interface being not associated with the computer application from the predefined list of computer applications, pasting the alternative data from the copy-paste clipboard into the user interface.

Figure 6:
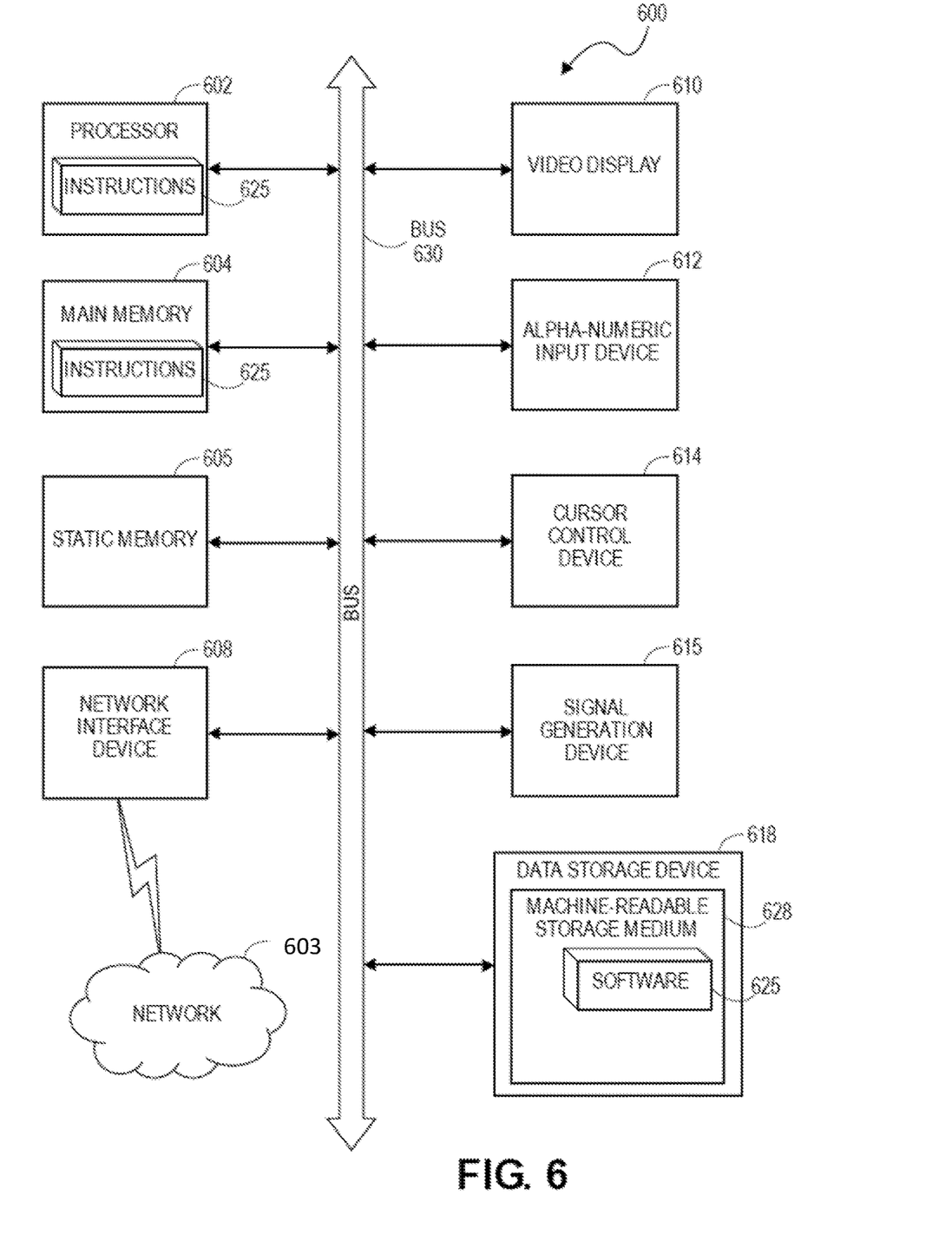
FIG. 6 is a block diagram of a computing device that may perform one or more of the operations described in accordance with one or more embodiments of the disclosure.

FIG. 6 is a block diagram of an example computing device 600 that may perform one or more of the operations described herein (such as the operations of the processing device 404 described in FIG. 4), in accordance with some embodiments. More particularly, computing device 600 may be integrated in or separate from any other computing device such as a server or other computing device to perform any of the described operations. Computing device 600 may be connected to other computing devices in a local area network (LAN), an intranet, an extranet, or the Internet. The computing device may operate in the capacity of a server machine in the client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 605 (e.g., flash memory and a data storage device 618), which may communicate with each other via a bus 630.

The processing device 602 may be provided by one or more general-purpose processing devices such as a microprocessor, central processing unit, or the like. In an illustrative example, processing device(s) 602 may comprise a complex instruction set computing (CISC) microprocessor, reduced instruction set computing (RISC) microprocessor, very long instruction word (VLIW) microprocessor, or a processing device implementing other instruction sets or processors implementing a combination of instruction sets. Processing device(s) 602 may also comprise one or more special-purpose processing devices such as an application specific integrated circuit (ASIC), a field programmable gate array (FPGA), a digital signal processor (DSP), network processor, or the like. The processing device(s) 602 may be configured to execute the operations described herein, in accordance with one or more aspects of the present disclosure, for performing the operations and steps discussed herein.

Computing device 600 may further include a network interface device 608 which may communicate with a network 603. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 615 (e.g., a speaker). In one embodiment, video display unit 610, alphanumeric input device 612, and cursor control device 614 may be combined into a single component or device (e.g., an LCD touch screen).

Data storage device 618 may include a non-transitory computer-readable storage medium 628 on which may be stored one or more sets of instructions 625 that may include instructions for carrying out the operations described herein, in accordance with one or more aspects of the present disclosure. Instructions 625 may also reside, completely or at least partially, within main memory 604 or within processing device(s) 602 during execution thereof by computing device 600, main memory 604 and processing device(s) 602 also constituting computer-readable media. The instructions 625 may further be transmitted or received over a network 603 via network interface device 608.

While computer-readable storage medium 628 is shown in an illustrative example to be a single medium, the term "computer-readable storage medium" should be taken to include a single medium or multiple media (e.g., a centralized or distributed database or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
generating alternative data from copied data from a first computer application;
adding the alternative data to a copy-paste clipboard; and
detecting an attempt by a user device to paste the copied data into a user interface, the method further comprising, by a processing device:
   in response to the user interface being associated with a computer application from a predefined list of computer applications, pasting the copied data into the user interface; and
   in response to the user interface being not associated with the computer application from the predefined list of computer applications, pasting the alternative data from the copy-paste clipboard into the user interface;
wherein generating the alternative data from the copied data includes generating a token associated with the copied data and adding the token to the copy-paste clipboard instead of the copied data;
   storing the copied data in its original form, in a memory; and
   associating the token with the copied data in the memory.

2. The method of claim 1, wherein associating the token with the copied data in memory comprises mapping the token with a memory location where the copied data is stored in the memory.

3. The method of claim 1, wherein the method further includes:
triggering an interrupt to determine whether the user interface is associated with the computer application on the predefined list of computer applications;
determining that the user interface is associated with the computer application on the predefined list of computer applications;
inspecting the token and determining a memory location where the copied data is stored in memory based on the token; and
pasting the copied data from the memory location to the user interface.

4. The method of claim 1, wherein the method further includes:
triggering an interrupt to determine whether the user interface is associated with the computer application on the predefined list of computer applications;
determining that the user interface is not associated with the computer application on the predefined list of computer applications; and
pasting the alternative data in the user interface, the alternative data including at least the token and other data that does not include the copied data.

5. The method of claim 1, wherein the first computer application is a web application.

6. An apparatus comprising:
a memory to store a copy-paste clipboard; and
a processing device operatively coupled with the memory to:
   generate alternative data from copied data from a first computer application;
   add the alternative data to the copy-paste clipboard; and
   detect an attempt by a user device to paste the copied data into a user interface, wherein the processing device is further to:
      in response to the user interface being associated with a computer application from a predefined list of computer applications, paste the copied data into the user interface; and
      in response to the user interface being not associated with the computer application from the predefined list of computer applications, paste the alternative data from the copy-paste clipboard into the user interface;
   wherein the alternative data includes a token associated with the copied data and the processing device is further to:
      add the token to the copy-paste clipboard instead of the copied data;
      store the copied data in its original form, in the memory; and
      associate the token with the copied data in the memory.

7. The apparatus of claim 6, wherein the processing device is further to map the token with a memory location where the copied data is stored in the memory.

8. The apparatus of claim 6, wherein the processing device is further to:
execute an interrupt to determine whether the user interface is associated with the computer application on the predefined list of computer applications;
determine that the user interface is associated with the computer application on the predefined list of computer applications;
inspect the token and determine a memory location where the copied data is stored in memory based on the token; and
paste the copied data from the memory location to the user interface.

9. The apparatus of claim 6, wherein the processing device is further to:
execute an interrupt to determine whether the user interface is associated with the computer application on the predefined list of computer applications;
determine that the user interface is not associated with the computer application on the predefined list of computer applications; and
paste the alternative data in the user interface, the alternative data including at least the token and other data that does not include the copied data.

10. The apparatus of claim 6, wherein the first computer application is a web application.

11. A non-transitory computer readable storage medium to store instructions executable by a processing device of a system to cause the system to:
generate alternative data from copied data from a first computer application;
add the alternative data to a copy-paste clipboard; and
detect an attempt by a user device to paste the copied data into a user interface, wherein the system is further caused to:
   in response to the user interface being associated with a computer application from a predefined list of computer applications, paste the copied data into the user interface; and
   in response to the user interface being not associated with the computer application from the predefined list of computer applications, paste the alternative data from the copy-paste clipboard into the user interface;
wherein the alternative data includes a token associated with the copied data and the system is further caused to:
   add the token to the copy-paste clipboard instead of the copied data;

store the copied data in its original form, in a memory; and associate the token with the copied data in the memory.

12. The non-transitory computer readable storage medium of claim 11, wherein the system is further to map the token with a memory location where the copied data is stored in the memory.

13. The non-transitory computer readable storage medium of claim 11, wherein the system is further to:

execute an interrupt to determine whether the user interface is associated with the computer application on the predefined list of computer applications;

determine that the user interface is associated with the computer application on the predefined list of computer applications;

inspect the token and determine a memory location where the copied data is stored in memory based on the token; and paste the copied data from the memory location to the user interface.

14. The non-transitory computer readable storage medium of claim 11, wherein the system is further to:

execute an interrupt to determine whether the user interface is associated with the computer application on the predefined list of computer applications;

determine that the user interface is not associated with the computer application on the predefined list of computer applications; and paste the alternative data in the user interface, the alternative data including at least the token and other data that does not include the copied data.

* * * * *